No. 757,677. PATENTED APR. 19, 1904.
J. A. POLK.
VEHICLE WHEEL.
APPLICATION FILED DEC. 30, 1903.
NO MODEL.
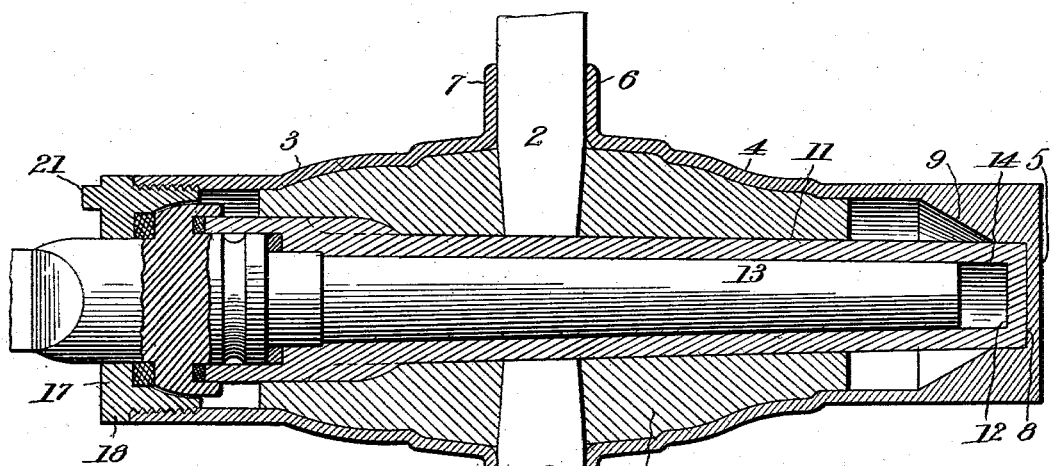
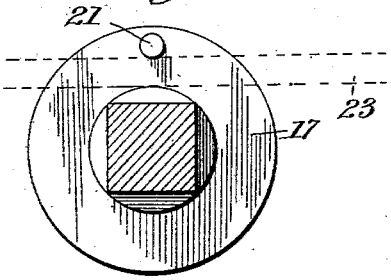
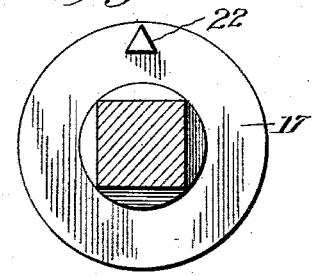
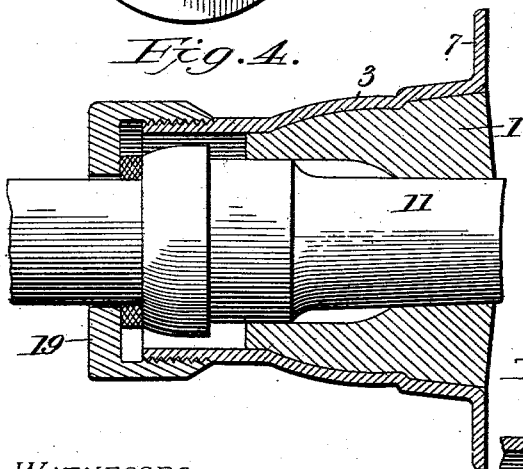
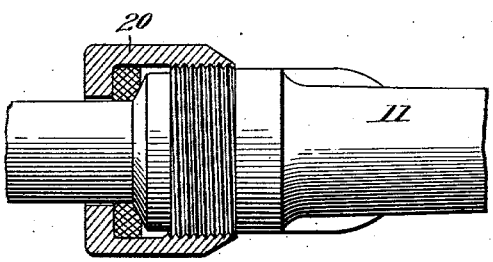
WITNESSES:
INVENTOR
James A. Polk
BY
Attorney No. 757,677.

Patented April 19, 1904.

UNITED STATES PATENT OFFICE.

JAMES A. POLK, OF TERRELL, TEXAS.

VEHICLE-WHEEL.

SPECIFICATION forming part of Letters Patent No. 757,677, dated April 19, 1904.

Application filed December 30, 1903. Serial No. 187,225. (No model.)

*To all whom it may concern:*

Be it known that I, JAMES A. POLK, a citizen of the United States, residing at Terrell, in the county of Kaufman and State of Texas, have invented a certain new and useful Improvement in Vehicle-Wheels, of which the following is a full, clear, and exact description.

The object of this invention is to provide a wheel with a hub so inclosing the axle point or nib as to exclude dust and grit and also prevent the escape of the lubricant.

The hub is composed of a wooden core surrounded by metal sheaths, the outer one having a closed end to exclude dust, &c., and provided with an axle-box centering and supporting pocket, by which also the necessity for wedging the axle-box centrally with the hub is avoided, and the axle-box also has its outer end closed to exclude dust, &c., and to provide a lubricant-chamber. The axle and the hub are connected in a dust-tight and oil-tight manner by a screw-cap of any one of several different forms, and means are provided for readily applying and removing this cap without requiring a wrench or spanner.

In the accompanying drawings, illustrating the invention, in the several figures of which like parts are similarly designated, Figure 1 is a longitudinal section of sufficient of a wheel and axle to show one form of the invention. Fig. 2 is an end view of one form of the cap. Fig. 3 is an end view of another form of cap. Fig. 4 is a longitudinal section showing the application of another form of cap. Fig. 5 is a longitudinal section showing the application of yet another form of cap. Fig. 6 is a longitudinal section of the outer end of a hub having a modified form of axle-box centering and supporting device.

The wooden member 1 of the hub may be of any ordinary or approved form, with the spokes 2 inserted therein. This wooden member has driven or pressed upon it two sheaths 3 and 4, the sheath 3 being open-ended and the sheath 4 having its outer end 5 closed. Both sheaths project beyond the wooden member of the hub so as fully to inclose and protect the axle-box at the front and the axle at the rear. The sheaths preferably are malleable castings provided with adjacent flanges 6 and 7, by which they and the spokes may be riveted, bolted, or otherwise fastened together.

In Fig. 1 the end 5 is shown as made with a cylindrical pocket 8, and the wall 9 of the sheath converges toward this pocket. In Fig. 6 the pocket is formed by an annular flange 10. In either case this pocket centers and receives the outer end of the axle-box 11, which is closed, as at 12. The axle-box is driven into the wooden member of the hub in the usual way after the sheaths have been applied and the pocket receives its outer end. Should the axle-box be deflected, as sometimes occurs, while being driven through the hub, the inclined wall 9 would tend to rectify such deflection, and thus is avoided the necessity of wedging up the axle-box.

The axle nib or point 13 is shorter than the axle-box, so as to leave a space 14 at the end, which serves as an oil-receptacle, and, as shown in Fig. 6, an oil-feeding tube 15 may be inserted through the sheath 4 into this receptacle, so as to enable one to supply fresh lubricant without taking off the wheel. This oil-feeding tube so located has its end closed by a screw-plug 16, and when said plug is removed the tube may be cleansed, if foul or choked, by running a straw or other object back and forth through it, so that the user may always know that the lubricant is flowing in, and so may be sure that the axle is lubricated.

The hub and axle may be connected in any of a number of ways, of which several are shown. In Fig. 1 a cap 17, having an external screw-thread, is tapped inside the sheath 3 and has a flange 18, which laps the end of the sheath, and thus, in connection with the washers, makes an oil-tight joint. As shown in Fig. 4, the cap 19 is internally screw-threaded and screws on the outside of sheath 3. In Fig. 5 the cap 20 is internally screw-threaded and screws on the axle-box. In order to remove the cap without a wrench or spanner, it is provided with a cylindrical lug 21, Figs. 1 and 2, or a triangular lug 22, Fig. 3, so that if a straight-edged piece of metal or other substance, such as indicated by dotted lines 23, Fig. 2, be inserted between said lug and the axle and the wheel turned said piece 23 will resist the movement of the cap with the wheel, and so run off said cap.

In all of the various forms of the invention the axle point or nib and the box are thoroughly protected from the entrance of dust, grit, sand, and the elements, and thus the durability as well as the cleanliness of the wheel are enhanced.

In sandy countries the grit works in between the axle and its box and soon cuts the axle and renders it worthless. The leakage of lubricant at front and rear of the hub soon defiles the hub and exposes the user's clothing to damage. These and other objectionable features of commonly-used wheels are overcome by my invention. Moreover, it will be observed that the axle-box is so arranged that the axle nib or point extends well forward or outward, and the spokes are practically about over the middle portion of said nib, so that the load is taken off the end, with the result of the wheel running free and true.

What I claim is—

1. A vehicle-wheel, having a hub constructed of a wooden member and metal sheaths applied to it, the outer sheath having a closed end and an axle-box pocket to center said axle-box as it is driven into the hub, combined with an axle-box having a closed outer end.

2. A vehicle-wheel, having a hub constructed of a wooden member and metal sheaths applied to it, the outer sheath having a closed end and a cylindrical pocket in such closed end with an adjacent convergent wall, combined with an axle-box having a closed outer end.

3. A vehicle-wheel, having a hub composed of a wooden core and inner and outer metal sheaths, the outer sheath closed at its outer end, a closed-end axle-box, and a screw-cap applied to the inner sheath.

4. A vehicle-wheel, having a hub composed of a wooden core, an outer surrounding metal sheath extending from the middle to the outer end and having an integrally-closed outer end, and an inner surrounding metal sheath extending from the middle to the inner end, an axle-box longer than the wooden core and having an oil-chamber at its outer end and a feed-tube opening into it, and a screw-cap applied to the inner end of the hub.

5. A vehicle-wheel, having a hub provided with a wooden core, a closed-end outer metallic sheath, an open-end inner metallic sheath having an internal screw-thread, a closed-end axle-box, and a screw-cap inserted in the screw-threaded sheath and having an outwardly-projecting lug for use in unscrewing it.

6. A vehicle-wheel, having a hub provided with a screw-cap to close its inner end, said cap having a rearwardly-projecting lug between which and the axle an obstruction may be placed so as to effect the unscrewing of said cap.

In testimony whereof I have hereunto set my hand this 29th day of December, A. D. 1903.

JAMES A. POLK.

Witnesses:
 Wm. H. Finckel,
 Ada C. Briggs.